G. Guenther Sheet 1, 2 Sheets.

Glue-Drying Apparatus.

No. 2,971. Reissued Jun. 9, 1868.

WITNESSES:
W. C. Dey
C. C. Livings

INVENTOR:
Geo Guenther
by his Attorney
H. G. Stetson

G. Guenther. Sheet 2, 2 Sheets.

Glue-Drying Apparatus.

No. 2,971. Reissued Jun. 9, 1868.

WITNESSES:

M. L. Dey

C. E. Livings

INVENTOR:

Geo Guenther by his Attorneys

J. E. Nelson

United States Patent Office.

GEORGE GUENTHER, OF CHICAGO, ILLINOIS.

*Letters Patent No.* 65,377, *dated June* 4, 1867; *reissue No.* 2,971, *dated June* 9, 1868.

IMPROVEMENT IN THE MANUFACTURE OF GLUE.

The Schedule referred to in these Letters Patent and making part of the same.

TO ALL WHOM IT MAY CONCERN:

Be it known that I, GEORGE GUENTHER, of the city of Chicago, county of Cook, and State of Illinois, have invented a certain new and useful Mode of Drying Glue on Revolving or Rotating Surfaces; and I do hereby declare that the following is a full, clear, and exact description thereof, reference being had to the accompanying drawings, making a part of this specification, in which—

Figure 1:
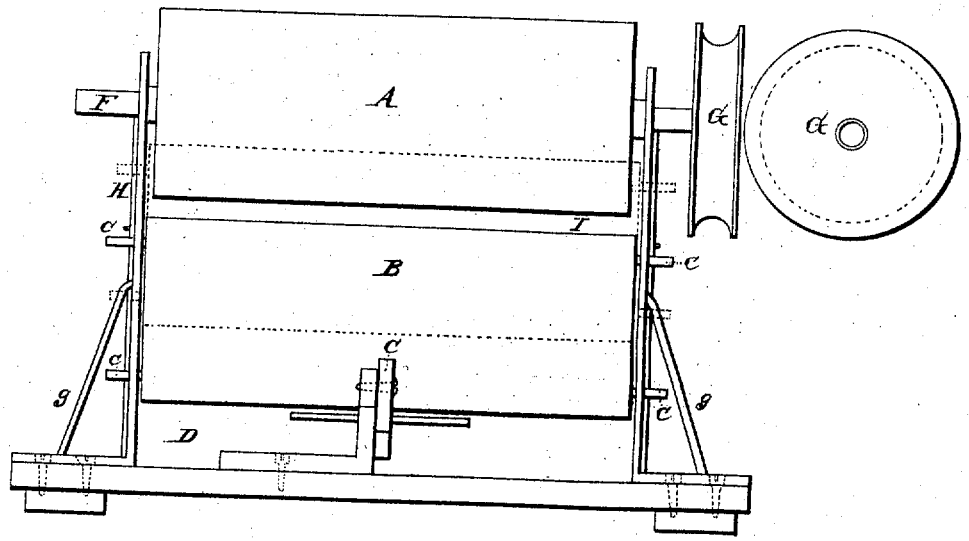

Figure 1 is a front elevation.

Figure 2:
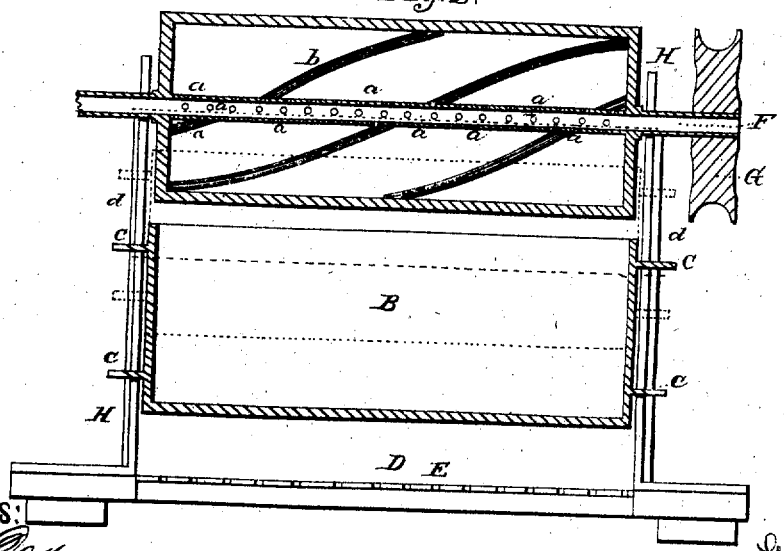

Figure 2, a vertical longitudinal section.

Figure 3:
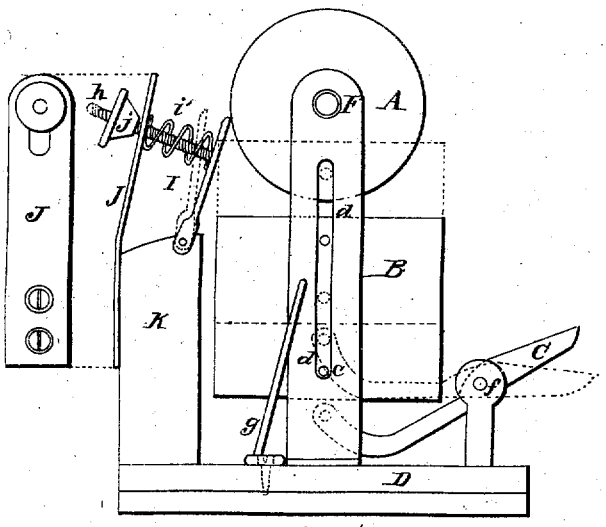

Figure 3, an end view.

Figure 4:
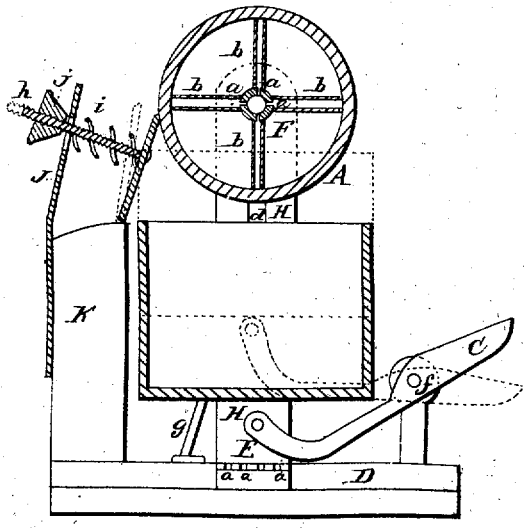

Figure 4, a transverse vertical section.

Figure 5:
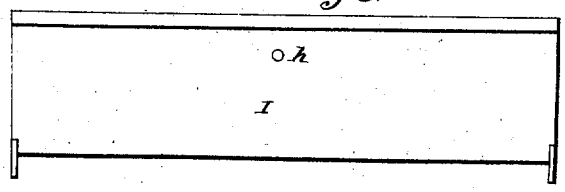

Figure 5, a view of the scraper detached.

Figure 6:
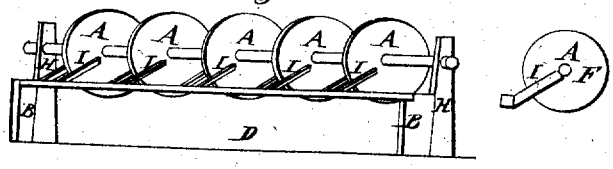

Figures 6 and 7, a view of a modification of the cylinder.

Like letters refer to similar parts in all of the figures.

My invention relates to the mode of drying glue upon revolving or rotating surfaces by the use of steam applied internally, or hot air externally, or both, as is hereinafter set forth. Heretofore, when glue has been manufactured to any extent, it has been dried upon netting by the simple action of the air, which, at the best, is slow, and in damp or rainy weather exceedingly difficult, while a high degree of heat has been found injurious to the glue.

By my mode I avoid these difficulties, and can produce a superior article in all conditions of the weather.

To enable others skilled in the art to make the necessary or desirable machinery to dry glue by my mode, I will proceed to describe its construction and operation.

As the dimensions may all be varied, without changing the principle or operation of the machinery, a description or detail will not be necessary. A convenient size will be found by making the cylinder A about six feet long and two feet in diameter, with corresponding proportions in the other parts.

The cylinder A is attached to the shaft F by ordinary heads or crown-sheets when used with steam, but will not need to be so constructed as to withstand a high pressure, as but a little higher pressure than atmospheric steam will be required. Much higher would increase the temperature of the cylinder so as to injure the glue. Steam is admitted through the shaft F, which is made hollow for that purpose, and passes out of the shaft by the holes or perforations *a*. The interior of the cylinder is provided with spiral ducts or guides, *b*, which carry the water of condensation to the centre, and discharge it through the opposite end of the shaft. The exterior is made smooth, and, if made of cast iron, turned off, and when made of cast iron, it will be found convenient in casting to make them shorter than the length given. This cylinder is supported by the posts or standards H, and revolved by the pulley-wheel G, or by other suitable or convenient means.

Directly below the cylinder, I place a trough, B, in which the glue-liquid is placed. This trough is supported in place by the bolts or pins *c*, which pass through the slot or mortise *d* of the post H, and is raised so that its contents will be brought in contact with the cylinder by the treadle C. This trough will be made in any convenient form.

The treadle C is pivoted at *f* to a post or standard, which, like the posts H, is firmly attached to the base or foundation, D At the back of the machine I attach a scraper, I, to the post K, or other suitable attachment, which scraper is provided with a sharp edge, which is brought to bear against the cylinder by a spring, *i*, which spring rests against the scraper and against the bar J, and is held in place by the rod or bar *h*. This rod is provided with a thumb-screw, to hold the scraper back while the cylinder is taking on glue-liquid, and while is is being dried. Where the scraper is of any considerable length, more than one of these rods and springs will be necessary.

When hot air is to be used, either alone or in conjunction with steam, I provide for its introduction by a perforated plate or register, E, placed in the base, D, or in the floor of the building, and in that case I mount the trough upon trucks or wheels, so that it can be removed as soon as a sufficient amount of stock is taken on by the cylinder, so that its action upon the cylinder will be direct from the register. Hot air may also be driven through the cylinders in place of steam.

Figs. 6 and 7 show a modification of the cylinder and scraper. As shown there, the cylinder, instead of being made perfect, is made of a series of disks attached to the shaft, which gives more surface for drying purposes than the plain cylinder. In case steam is used with them, they will be made hollow, and the ducts for the water of condensation placed on the sides or heads; if hot air only, then they may be made of solid plates. The scrapers will be necessarily be made so as to take the sides as well as the periphery.

In operation, when the revolving part is put in motion, the trough is elevated so that it will dip, and it is held there until a sufficient quantity of glue-liquid is taken on, when it is lowered or removed. The rotation continues until the glue is sufficiently dried, when the scraper I is applied, and it is taken off. The scraper is then withdrawn and the operation repeated.

It will be found, by testing this method, that glue can be dried without injury with much greater rapidity and facility than by any of the modes heretofore in use.

Having thus fully described my mode of drying glue, and the necessary machinery to carry it out, what I claim as new, and as my invention, and desire to secure by Letters Patent, is—

The mode of drying glue by revolving or rotating surfaces, having their temperatures raised either by steam or hot air, substantially as described.

In testimony whereof, I have hereunto set my name in presence of two subscribing witnesses.

GEO. GUENTHER.

Witnesses:

TH. HOLMAN,

JNO. DRESSLER.